United States Patent [19]

Teraoka et al.

[11] Patent Number: 4,838,119
[45] Date of Patent: Jun. 13, 1989

[54] DIFFERENTIAL GEAR ASSEMBLY WITH VISCOUS AND FRICTION CLUTCH MECHANISMS

[75] Inventors: Masao Teraoka; Osamu Ishikawa; Yukio Yuhashi, all of Tochigi, Japan

[73] Assignee: Tochigifujisangyo Kabushiki Kaisha, Japan

[21] Appl. No.: 40,315

[22] Filed: Apr. 20, 1987

[30] Foreign Application Priority Data

Apr. 24, 1986 [JP] Japan .......................... 61-060893[U]
Nov. 12, 1986 [JP] Japan .......................... 61-172516[U]

[51] Int. Cl.⁴ ...................... F16H 1/455; F16D 35/00; F16D 25/063
[52] U.S. Cl. .................... 74/711; 192/58 B; 192/82 T
[58] Field of Search ............... 74/710.5, 711; 192/82 T, 58 B

[56] References Cited

U.S. PATENT DOCUMENTS

| | | | |
|---|---|---|---|
| 4,031,780 | 6/1977 | Dolan et al. | 192/35 X |
| 4,040,271 | 8/1977 | Rolt et al. | 74/711 X |
| 4,058,027 | 11/1977 | Webb | 74/711 |

FOREIGN PATENT DOCUMENTS 47-203 5/1972 Japan .
51-99769 9/1976 Japan .

Primary Examiner—Allan D. Herrmann
Attorney, Agent, or Firm—Samuels, Gauthier, Stevens & Kehoe

[57] ABSTRACT

A differential apparatus comprises first and second rotary devices rotatable with respect to each other, a viscous clutch having a chamber filled with a viscous fluid and restricting a differential operation generated between the first and second rotary devices by the resistance of the viscous fluid, a friction clutch separated from the viscous clutch and restricting the differential operation, and a device for preventing the seal of the chamber from being reduced by an increase in pressure within the chamber and actuating the friction clutch in accordance with an input torque.

3 Claims, 5 Drawing Sheets

DIFFERENTIAL GEAR ASSEMBLY WITH VISCOUS AND FRICTION CLUTCH MECHANISMS

BACKGROUND OF THE INVENTION

1. Field of the Invention

The present invention relates to an improvement of a differential gear having a differential restricting mechanism.

2. Description of the Prior Art

Recently, a viscous clutch such as the one disclosed in the Japanese Laid-open Utility Model No. 47-203 tends to be used instead of a friction clutch for the differential restricting mechanism.

The viscous clutch utilizes the viscous resistance of a viscous fluid to realize a differential restricting action according to differential rotation between resistance plates which are provided for, for instance, axles and a differential casing respectively.

Comparing the viscous clutch with the frictional clutch, it will be seen that the frictional clutch does not cause a rise in torque even when a differential speed is increased so that the restricting effect thereof may not vary. On the other hand, the viscous clutch can realize the restricting effect in response to the differential speed, and it causes no noise, less wear, and a smooth action, because the viscous clutch is a non-contact type clutch.

When the viscous clutch is subjected to a differential action, however, temperature as well as pressure in an operation chamber of the viscous clutch will be increased, increasing a chance of breaking seals and deteriorating functions.

The viscous clutch is constituted such that the differential restricting effect thereof is effected only when a differential rotation is caused. Therefore, in a circumstance that wheels get in the mud, the transmission of torque through the viscous clutch is delayed momentarily so that it may not be quick to get out of the mud compared to the friction clutch.

Another conventional differential gear is disclosed in Japanese Laid-Open Patent 51-99769 in which a differential gear is provided with a mechanism for restricting the differential operation using a viscous coupling. The viscous coupling has a structure in which a plurality of resistance plates opposite each other are disposed on the axle side and on the differential casing side for example within an operation chamber filled with a viscous fluid.

When a rotational difference between the resistance plates is generated due to slip, etc. of a wheel, the resistance plates are rotated while shearing the viscous fluid so that a great shearing resistance is applied to the viscous coupling and restricts the differential operation.

However, the viscous coupling utilizes the viscous resistance of the viscous fluid at the shearing time when the viscous fluid is sheared by the difference of the number of rotations between the resistance plates. Accordingly, when the viscous fluid is sheared, i.e., the differential operation is continued for a long time, the temperature of the viscous fluid is increased and thereby the pressure within the operation chamber is increased so that it is possible to damage a seal member, etc. of the viscous coupling.

To overcome these problems, it is considered to use a means for preventing the continuous differential operation by actuating a friction clutch mechanism by the pressure within the viscous coupling when the pressure within the viscous coupling is increased. Such a preventing means is shown in FIG. 1. In FIG. 1, a mechanical friction clutch mechanism 305 is located outside a viscous coupling 307 within a differential casing 301 and is disposed between a rear portion of one side gear 303 and the differential casing 301. In such a structure, when the pressure within the viscous coupling 307 is increased, the other side gear 311 forming an operation chamber 309 of the viscous coupling 307 is moved in the axial direction and transmits this axial movement to the clutch mechanism 307 through a pinion gear 313 meshing with the side gear 311, and the side gear 303. Thus, the clutch mechanism 307 is coupled, thereby restricting the differential operation.

However, in such a conventional apparatus, when the pressure F within the operation chamber 309 is increased, the pressure F is transmitted to the clutch mechanism 305 through the side gears 311 and 303 meshing with the pinion gear 313 at any time, so that there is no back-lash of the respective gears, thereby sometimes damaging them or no smooth differential operation being obtained.

SUMMARY OF THE INVENTION

In view of the above problems, an object of the present invention is to provide a differential apparatus in which the seal of a chamber disposed in a viscous clutch device and filled with a viscous fluid is not reduced by an increase in pressure within the chamber and a friction clutch is actuated in accordance with an input torque.

In order to accomplish the object mentioned above, a differential apparatus of the present invention comprises first and second rotary means rotatable with respect to each other, a viscous clutch means having a chamber filled with a viscous fluid and restricting a differential operation generated between the first and second rotary means by the resistance of the viscous fluid, a friction clutch means separated from the viscous clutch means and restricting said differential operation, and third means for preventing the seal of the chamber from being reduced by an increase in pressure within said chamber and actuating the friction clutch means in accordance with an input torque.

BRIEF DESCRIPTION OF THE DRAWINGS

The other objects, features and advantages of the present invention will become apparent from the following descriptions of the preferred embodiments taken in conjunction with the accompanying drawings in which.

DETAILED DESCRIPTION OF THE PREFERRED EMBODIMENTS

The preferred embodiments of the present invention will be described in detail with reference to the drawings.

Figure 1:
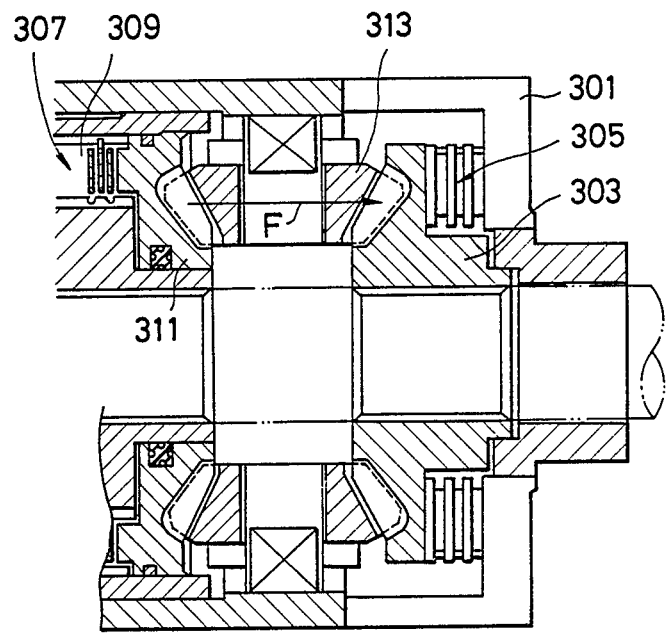
FIG. 1 is a partially cross-sectional view of a conventional differential gear.
Figure 2:
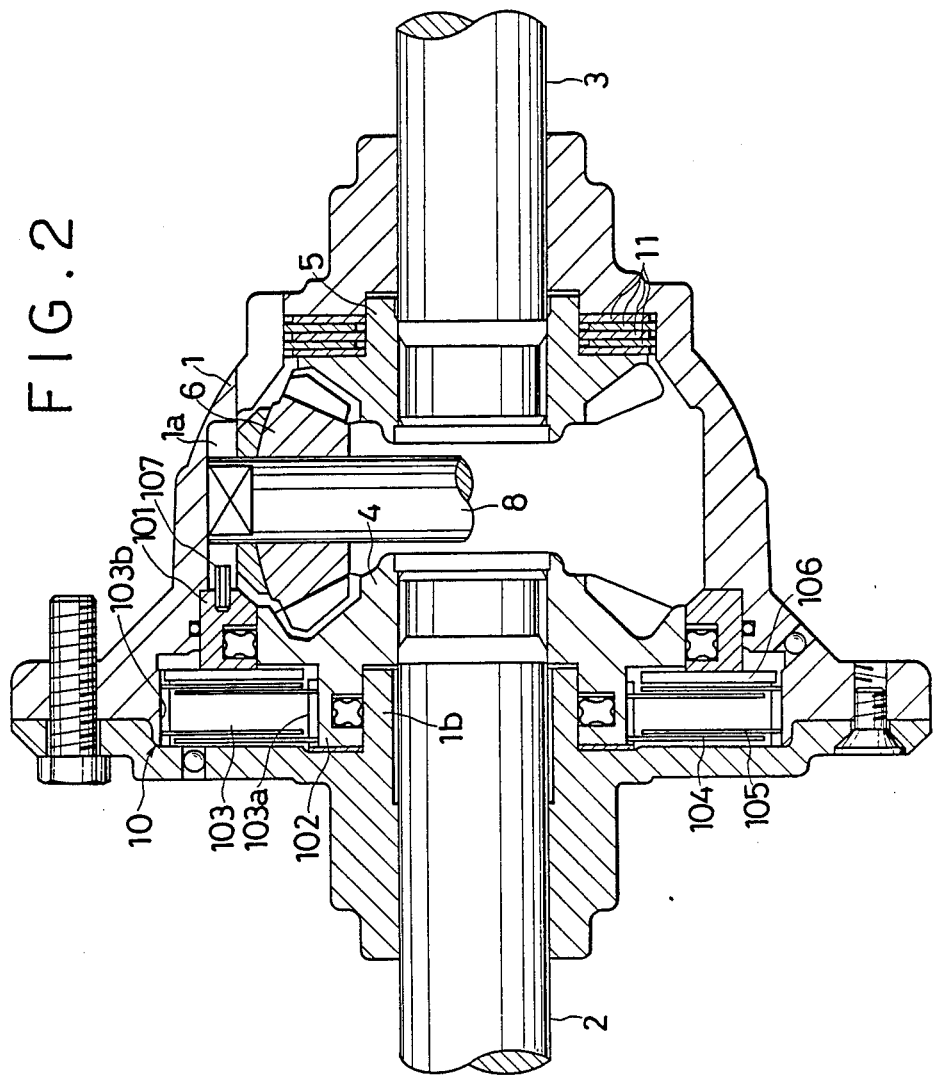
FIG. 2 is a cross-sectional view showing a differential gear according to present invention.

FIG. 2 is a view showing a differential gear according to the present invention. The differential gear comprises a differential casing 1 rotatably connected to a drive shaft (not shown), left and right axles 2 and 3 passing through the left and right sides of the differential casing 1 and supported thereby, a pair of side-gears 4 and 5 slidably connected through splines to the projecting ends of the axles 2 and 3 respectively, a pinion gear 6 disposed between and orthogonal to the side-gears 4 and 5 and meshing with the side-gears 4 and 5, and a pinion shaft 8 for supporting the pinion gear 6.

A supported end of the pinion shaft 8 is movable along a long bearing groove 1a formed in the longitudinal direction inside the differential casing 1.

In the figure, between the back face of the left side-gear 4 and the inner surface of the differential casing 1, there is assembled a viscous clutch 10 which constitutes a differential restricting mechanism. Between the back surface of the right side-gear 5 and the differential casing 1, there are interposed a plurality of clutch plates 11 engaged in the rotational direction with the side-gear 5 and the differential casing 1 alternately to constitute a friction type differential restricting mechanism.

The viscous clutch 10 is provided with an annular isolation plate 101 fitted airtightly in a space between the periphery of the side-gear 4 and the inner circumference of the differential casing 1. The periphery of a supporting portion 1b formed projectingly inside the differential casing 1 engages rotatably and airtightly with a projection 102 formed on the back surface of the side-gear 4. The projection 102, the back surface of the side-gear 4, and the differential casing 1 form a sealed operation chamber 103.

Inside the operation chamber 103, spline grooves 103a and 103b are disposed on the projection 102 and on the inner circumference of the differential casing 1 respectively. The spline grooves 103a and 103b engage with the outer and inner circumferences of resistance plates 104 and 105 to separate the operation chamber 103.

In the operation chamber 103, there is filled a high viscosity hydraulic fluid such as silicon oil.

At an end of the isolation plate 101, there is implanted a spring pin 107 to project inside the bearing groove 1a. The spring pin 107 prevents the isolation plate 101 from turning together with the side-gear 4.

The operation of the differential gear with the above arrangement will be described.

When a differential action is caused between the axles 2 and 3, there is caused a differential rotation between the projection 102 provided on the side-gear 4 and the differential casing 1. As a result, the differential restricting action is realized between the resistance plates 104 and 105 due to the viscosity resistance of the hydraulic fluid in the operation chamber 103. This circumstance is the same as that achieved by the viscous clutch of the prior art.

When the differential action is continued, the temperature of the hydraulic fluid is increased to reduce the viscosity, thereby reducing the differential restricting action. However, according to the increase of pressure due to the rise in temperature of the operation chamber 103, the side-gear 4 is pushed in the thrust direction to push the other side-gear 5 through the pinion gear 6. As a result, the back surface of the side-gear 5 causes the clutch plates 11 to be pressed against one another, thereby realizing another differential restricting action by the clutch plates 11.

The differential restricting action by the clutch plates 11 is achieved in response to the magnitude of torque to be applied so that the differential restricting action may satisfactorily be effected even when the torque of the viscous clutch 10 is excessive.

Figure 3:
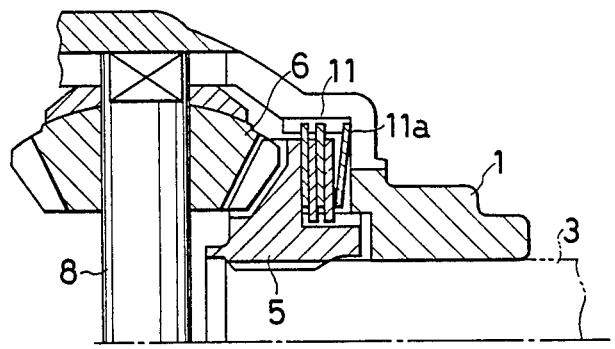
FIG. 3 is a cross-sectional view showing an essential part of another embodiment of the differential gear according to the present invention.

FIG. 3 is a view showing another embodiment of the present invention, in which clutch plates 11 are applied with initial torque by pushing them by a resilient member 11a such as a disk spring. By giving such initial torque, a differential restricting action can be realized by the initial torque even when there is no differential rotation. When the differential rotation is generated, the differential restricting action due to the viscosity resistance by the viscous clutch is added so that a strong differential restricting action may be realized. In this case, the rise in pressure in the viscous clutch causes the side-gear to move in the axial direction, further pressing the clutch plates 11 against one another so that a strong differential restricting action can be realized.

As described in the above in detail, according to the present invention, force in the thrust direction is generated when the pressure in the operation chamber is increased to cause one of the side-gears to push the other side-gear through the pinion gear against the friction clutch which achieves a differential restricting action at once. As a result, compared to the prior art differential restricting mechanism using only a viscous clutch, no breakage due to the increase in pressure will occur on seals, and the differential restricting action can be executed quickly even then the magnitude of torque is great.

Figure 4:
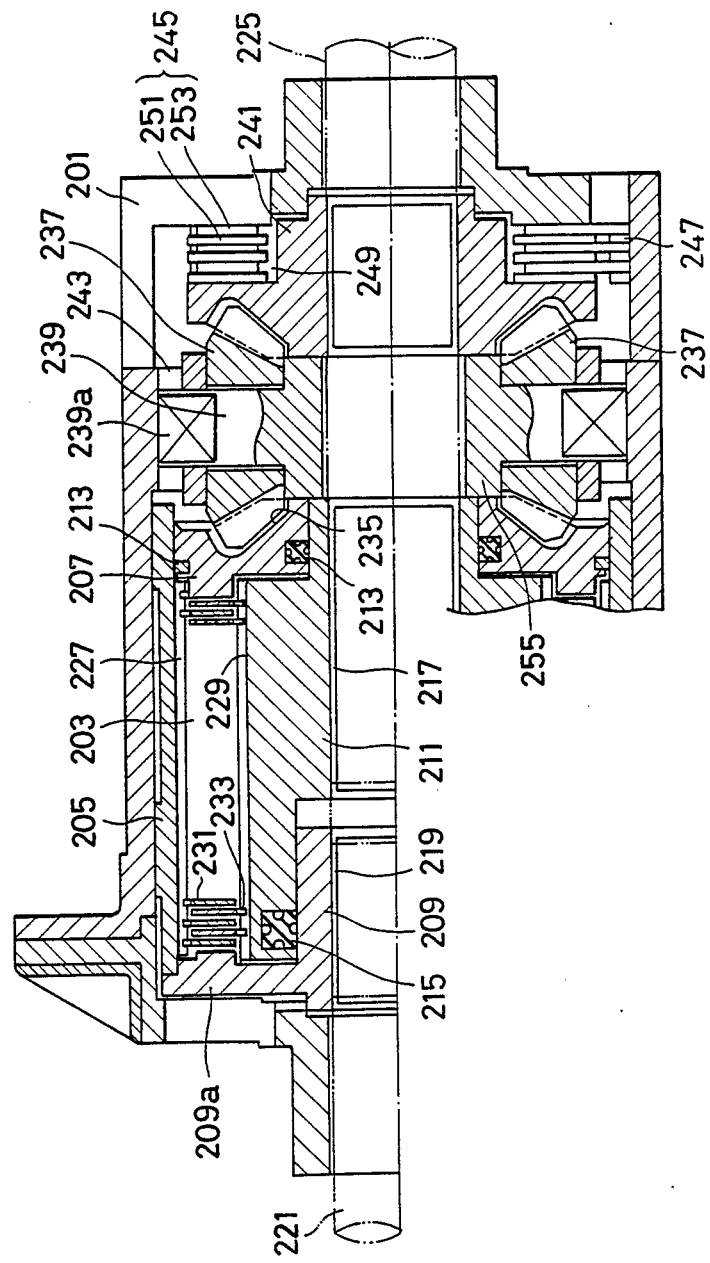
FIG. 4 is a cross-sectional view showing a differential gear according to a further another embodiment of the present invention.

FIG. 4 shows a differential gear in another embodiment of the present invention. A differential casing 201 receives a rotational input torque through a ring gear from an unillustrated drive gear.

An operation chamber 203 is formed on one side of the differential casing 201 and is filled with a working fluid having a high viscosity such as silicon oil.

The operation chamber 203 comprises an outer member 205 arranged along the inner circumference of the differential casing 201, a side plate 207 disposed on one side of the outer member 205, a sleeve 209 with a flange 209a, and an inner member 211 disposed within the outer member 205. The side plate 207 is, hermetically and rotatably fitted by a seal member 213, on to a small diameter portion of the, inner member 211. The outer member 205 is fixed to the sleeve flange 209a. The outer member 205 and the side plate 207 are axially moved with respect to each other and are integrally rotated. The sleeve 209 and the inner member 211 are rotatable with respect to each other.

A large diameter portion of the inner member 211 is rotatably mounted onto the sleeve 209 and is sealed by the seal member 215.

Splines 217 and 219 are respectively formed in the axial portions of, the inner member 211 and the sleeve 209 with the flange 209a. Right and left axles 221 and 225 are respectively spline-fitted onto the splines 219 and 217.

Splines 227 and 229 are respectively formed on the inner circumference of the outer member 225 and on the outer circumference of the inner member 211 defining the operation chamber 203. A plurality of resistance plates 231 and 233 are opposite each other. The resistance plates 231 are engaged with the outer member 205, and the other resistance plates 233 are engaged with the inner member 211. The resistance plates 231 are integrally rotated together with the side plate 207 and the left axle 221. The resistance plates 233 are integrally rotated together with the right axle 225.

A gear portion 235 is formed in the side plate 207 adjacent to the operation chamber 203 and forming one side gear. Namely, the gear portion 235 meshes with a rotatable pinion gear 237 integrally rotated together with the differential casing 201.

The pinion gear 237 is rotatably mounted on a pinion shaft 239 disposed within the differential casing 201 and meshing with another side gear 241 which is not adjacent to the operation chamber 203. A spline is formed in an axial hole of the side gear 241 extending therethrough and axially receiving the axle 225, thereby spline-engaging the side gear 241 with the axle 225. When the pinion shaft 239 is attached to the differential casing 201, a fitted portion 239a of the pinion shaft 239 is fitted to a groove 243 axially formed on the inner circumferential surface of the differential casing 201, so that the pinion shaft 239 can be movable in the axial direction.

A clutch mechanism 245 is disposed between the rear portion of the side gear 241 and the differential casing 201. Splines 249 and 247 are respectively disposed on the outer circumference of the base portion of the side gear 241 and the inner circumference of the differential casing 201 The splines 249 and 247 are respectively engaged with a pair of friction clutches 251 and 253 so as to oppose each other.

Figure 5:
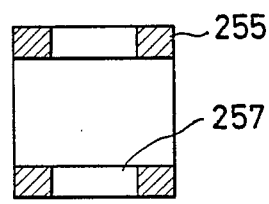
FIG. 5 is a cross-sectional view of a thrust member according to embodiment of FIG. 4.

A projection 255 as a thrust member is disposed in the pinion shaft 239. The thrust member 255 is cylindrically formed and is integral with an intermediate portion of the pinion shaft 239. One end of the thrust member 255 contacts the side plate 207 forming one side gear on the left hand side of FIG. 4, and the other end of the thrust member 255 contacts the other side gear 241 on the right hand side of FIG. 4. As shown in FIG. 5, the thrust member 255 may be formed such that it is not integral with but separated from the pinion shaft 239. In this case, a through hole 257 through which the pinion shaft 239 extends is disposed in the outer circumference of the cylindrical thrust member 255.

In the differential gear constructed above, when there is no rotational difference between the right and left axles 221 and 225 in a straight movement of a vehicle, for example, the rotational torque of the differential casing 201 is transmitted at the same rotational speed from the pinion gear 237 to one axle 225 through the side gear 241 and the other axle 221 through the gear portion 235 of the side plate 207, the outer member 205 of the operation chamber 203 and the sleeve 209 with the flange.

When a differential rotation is generated between both axles 221 and 225 due to slip, etc. of the vehicle, the pinion gear 237 is rotated and thereby the respective resistance plates 231 and 233 are relatively rotated against the resistance of the working fluid. At this time, the differential operation is restrained by the resistance of the working fluid so that a torque is transmitted to one of the axles 221 and 225 which does not slip and the vehicle is easily escaped from the slipped place.

When the differential operation is continued for a long time, the temperature of the working fluid is increased and the pressure within the operation chamber 203 is increased so that the side plate 207 is pressed in the thrust direction. The thrust force is applied to the other side gear 241 through the thrust member 255 so that the clutch plates 251 and 253 are coupled to each other. Thus, the differential casing 201 and the side gear 241 becomes integral with each other, restricting the differential operation. The side gear 241 and the pinion gear 237 reliably mesh with each other, thereby performing a smooth differential operation.

Figure 6:
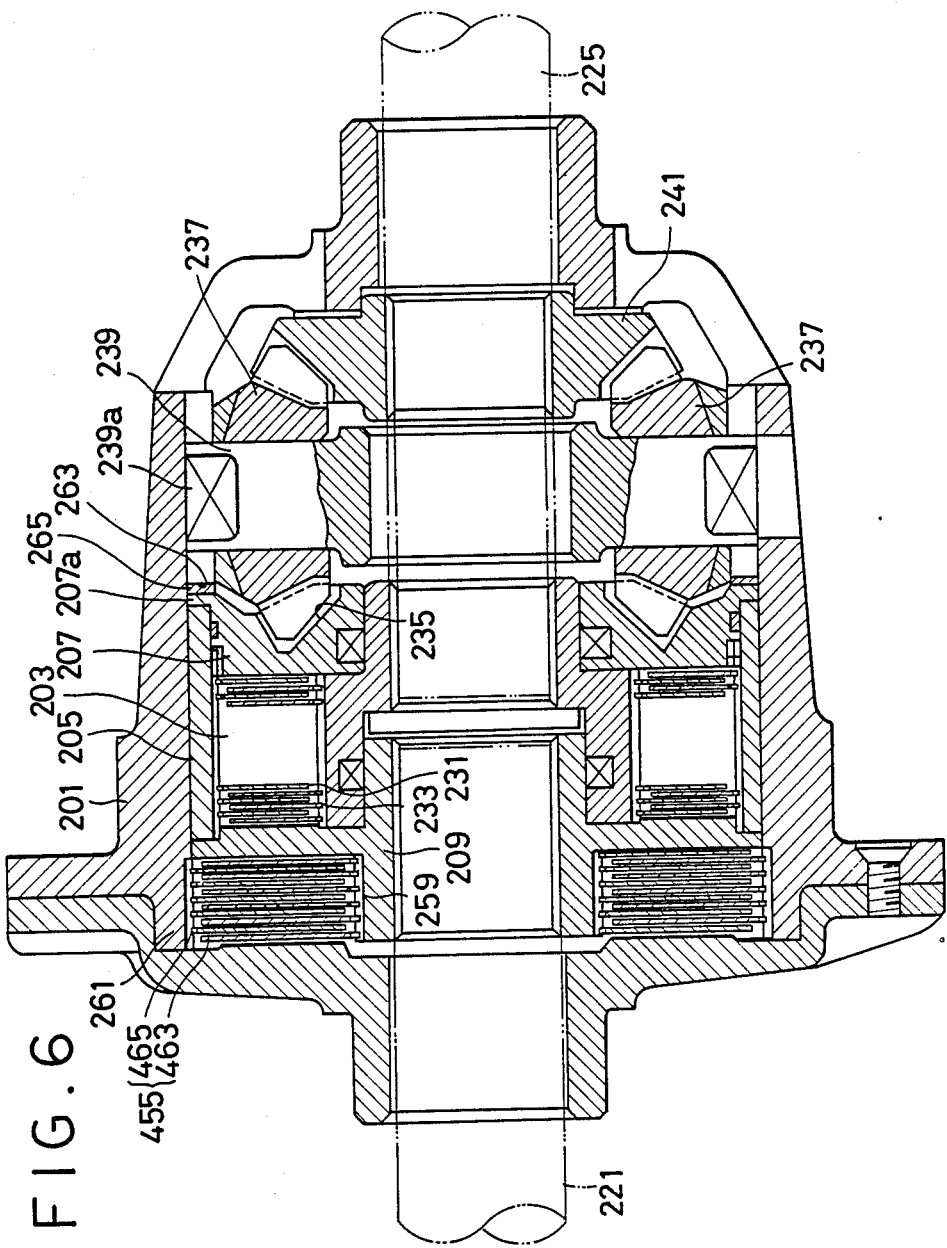
FIG. 6 is a cross-sectional view similar to the cross-sectional view of FIG. 4 and showing a differential gear in a further another embodiment of the present invention.

FIG. 6 shows another embodiment of the present invention. In this embodiment, a clutch mechanism 455 comprises of friction clutch plates 463 and 465, and is disposed on the side of the operation chamber 203 within the differential casing 201. Splines 259 and 261 are respectively formed on the outer circumference of a sleeve 209 with a flange and the inner circumference of the differential casing 201. The splines 259 and 261 are respectively engaged with the friction clutch plates 463 and 465 so as to oppose each other. An end surface 207a of a side plate 207 having a large diameter is located on the outer circumference of the side plate 207 and contacts a radial wall 263 of the differential casing 201 through a thrust member 265 in the shape of a washer.

The other constructions of FIG. 6 are similar to those of FIG. 4 and therefore the detailed descriptions thereof will be omitted.

In the differential gear shown in FIG. 6, the functions of the differential gear with respect to the differential operation are similar to those already described with reference to FIG. 4.

When the differential operation is continued for a long time in the differential gear of FIG. 6, the temperature of the working fluid is increased and thereby the temperature within the operation chamber 203 is increased so that the side plate 207 is pressed in the thrust direction. At this time, the movement of the side plate 207 in the thrust direction is prevented by the thrust member 265, and the sleeve 209 with the flange is moved by the reaction of the thrust member 265, thereby pressing the clutch plates 463 and 465. Thus, the clutch plates 463 and 465 are strongly coupled to each other so that the differential operation between the differential casing 201 and the sleeve 209 with the flange is restrained.

In the differential gear shown FIGS. 4 to 6, the operation chamber and the differential casing are separated from each other, but may be disposed so as to be integral with each other.

As mentioned above, in the differential gear shown in FIGS. 4 to 6, when the pressure within the operation chamber is increased, the increased pressure is transmitted to the clutch mechanism through the thrust member so that the increased pressure does not adversely affect the mesh between the side gears and the pinion gear, thereby securing a smooth differential operation.

What is claimed is:

1. A differential gear assembly comprising:
    a pair of said gears mounted for relative rotation about a common axis within a differential casing;
    a pinion gear in meshed relationship with and interconnecting the respective side gears;
    an operating chamber formed between an outer member and an inner member integral with an axle, said chamber extending in the direction of said axis and being filled with a viscous fluid;
    a plurality of resistance plates disposed within the operating chamber and alternately joined to the outer member and the inner member, whereupon relative rotation of said resistance plates occasioned by relative rotation of said outer and inner members will result in an increase in fluid pressure within said operating chamber;

a fictional clutch mechanism adjacent to one of the side gears for restricting the differential rotation of the side gears; and force transmitting means responsive to said increase in fluid pressure for applying a thrust force to the friction clutch mechanism, the arrangement of said force transmitting means being such that the meshed relationship between said pinion gear and said side gears is isolated from and thus unaffected by the application of said thrust force.

2. The differential gear assembly of claim 1 wherein said force transmitting means includes a thrust member interposed between a nd in contact with said side gears.

3. The differential gear assembly of claim 1 wherein said force transmitting means includes a thrust member defining a portion of said operating chamber.

* * * * *